United States Patent Office 3,527,808
Patented Sept. 8, 1970

3,527,808
PROCESS FOR PURIFICATION OF TRIS(HY-DROXYMETHYL)AMINOMETHANE
Frederick W. Schmitz and Robert E. Laine, Terre Haute, Ind., assignors to Commercial Solvents Corporation, New York, N.Y., a corporation of Maryland
No Drawing. Filed Mar. 28, 1968, Ser. No. 716,999
Int. Cl. C07c 89/04
U.S. Cl. 260—584      1 Claim

ABSTRACT OF THE DISCLOSURE

A two-stage crystallization process for the production of tris(hydroxymethyl)aminomethane substantially free from color-producing impurities, water insoluble material and fine particles of less than 100 mesh and resistant to caking during storage.

BACKGROUND OF THE INVENTION

In U.S. Pat. 3,338,970, F. W. Schmitz and J. B. Tindall described a process for the purification of tris(hydroxymethyl)aminomethane (TA) wherein a concentrate of 20–60% of TA having an impurity ratio of 0.05–0.5 mole of impurity per mole of TA was crystallized in a continuous, evaporative crystallizer at 40–190° F. and 5–300 mm. pressure. In this process, 50–90% of the TA was crystallized; the crystals were separated, washed with cold water or methanol yielding a product of greater than 99% purity characterized by the uniformity of crystal size.

This process has generally provided an industrial grade of TA satisfactory for most uses. However, the residual impurity, though only a small fraction, proved troublesome in several applications so that an even more highly purified product at little or no extra cost was needed. One of the most troublesome features of the product was that it caked badly during storage. Commonly, the entire contents of the bag set up to a solid mass and was very difficult to break up. Repeated attempts to solve this problem were unsuccessful but ultimately the cause of the caking was found due to the presence in the product of about 15–20% of fines of less than 100 mesh which resulted from crystal breakage during the separation step. The residual impurities, possibly N-alkylated TA, were troublesome because they caused color development in the preparation of synthetic drying oils, and there was present a very small but undesirable water insoluble fraction of unknown composition and origin. These residual impurities are also objectionable in biological and pharmaceutical applications and were difficult to remove in the final refinement steps for these applications.

SUMMARY OF THE INVENTION

It is an object of this invention to provide an improved process for the purification of TA.

It is another object of this invention to provide TA having improved caking resistance.

Another object of this invention is to provide a grade of TA substantially free from color-producing impurities and water insolubles.

The objects of this invention are fulfilled by the discovery of an improved process for the purification of TA. According to the new process, the TA concentrate is crystallized in a continuous, evaporative crystallizer (hereafter designated the first crystallizer) as described in U.S. Pat. 3,338,970, which is incorporated herein by reference thereto. The TA is separated from the mother liquor and is then redissolved in water, filtered to remove the insoluble fraction and recrystallized in a second evaporative crystallizer. The resulting crystals are again separated from the mother liquor by means of a continuous, pusher-type or a continuous, scroll-type centrifuge yielding high uniformity of crystals containing from less than 1% to about 5% of —100 mesh fines, washed and dried to yield a product of at least 99.6% by weight purity. The product exhibits excellent storage properties with little or no tendency to cake, is free from color-producing impurities and water insolubles and can be readily refined for biological and pharmaceutical purposes.

A feature of the present invention is the efficiency of the process which derives from the discovery that (1) a portion of the mother liquor from the first separation can be recycled to the first crystallizer in an amount sufficient to provide a molar impurity ratio of about 0.3–2.0:1 of impurity to TA in the liquid phase of the slurry contained in the crystallizer, the second portion being refined according to the prior process, and (2) a portion of the mother liquor from the second separation step can be recycled to the second crystallizer in an amount sufficient to provide an impurity ratio of about 0.05–0.4:1 in the liquid phase of the slurry contained in the second crystallizer, the second portion of the mother liquor being recycled to the first crystallizer.

DETAILED DISCUSSION

It is known from the prior process to continuously crystallize TA from an aqueous solution of TA, generally in the range of about 20 to 60%, in a continuous, evaporative crystallizer to produce a slurry of TA crystals and a liquid phase, and to separate the crystals, as by centrifuging. The crystals were washed and dried and the mother liquid, i.e., the liquid phase of the slurry, was processed for recovery of TA dissolved therein. The mother liquor contains impurities such as the N-monomethyl and N,N-dimethyl derivates of tris(hydroxymethyl)aminomethane; 2-amino-2-ethyl-1,3-propanediol; 2-amino-2-methyl-1,3-propanediol; ethanolamine; 2-amino-1,3-propanediol; 2-amino-1-propanol; and 2-amino-2-methyl-1-propanol.

In the present process, the first evaporative crystallizer is operated as before under temperature and pressure conditions which continually evaporate water resulting in crystallization of TA. Preferably, the crystallization is conducted so as to crystallize about 30 to 90%, preferably 50–55%, by weight of the TA present in the aqueous feed. When, for instance, a 40% concentrate of TA in aqueous solution is employed as the feed, the crystallizer is operated at a temperature of about 40 to 190° F. at an absolute pressure of about 5.0 to 305 mm. of Hg. Usually a temperature of about 130° to 160° F. and a pressure of about 75 to 125 mm. of Hg is utilized.

The crystallization step results in a slurry composed of solid crystals of TA and a liquid phase (mother liquor). Under the preferred crystallization conditions aforementioned, the crystallization provides about 200 to 700 grams of crystals per liter of slurry and the liquid phase generally contains about 15 to 50%, preferably about 17 to 38%, by weight of water. The slurry is continuously withdrawn from the crystallizer and the TA crystals are separated from the liquid phase, designated as mother liquor (I). The separation can be effected by any suitable means, e.g., by filtration, decantation or centrifugation, and centrifugation is preferred.

According to the improvements of the present invention, the mother liquor (I) from the first crystallizer is divided into two portions. One portion is returned to the first crystallizer in an amount sufficient to maintain an impurity ratio of 0.3–2.0:1, preferably 0.8 to 1.5:1, in the liquid phase in the crystallizer. The second portion is evaporated and the impurities are separated from residual TA in accordance with the prior art.

In the prior process, the crystals obtained in the preceding step were washed with cold water or methanol and dried. According to the process of the present invention, the washed TA crystals from this first separation are redissolved in water to form a second concentrate as before, in the range of about 20–60%, but usually about 30–50% by weight. The second concentrate is then filtered by any suitable means, e.g., by use of a filter precoated with a filter aid, or by admixing, and is then passed to a second continuous, evaporative crystallizer operated at about 100 mm. pressure and 150° F. The water is evaporated continuously and the feed rate and take-off rate of slurry are selected to provide constant volume and a slurry of about 30 to about 50% by weight of crystals. As the slurry exits from the crystallizer, the TA crystals are separated, preferably by centrifugation.

In a preferred embodiment, the separation of crystals from the mother liquor obtained in the second evaporative crystallizer is effected by a continuous, pusher-type or a scroll-type centrifuge. The crystals so obtained are relatively free from fines—less than 1% of −100 mesh—and remain free from caking during storage.

The mother liquor (II) from the second crystallizer is divided. One portion is returned to the second evaporative crystallizer in an amount sufficient to maintain an IR of 0.05–0.4, preferably about 0.2:1 in the liquid phase. The second portion is passed to the first crystallizer. The crystals obtained in the separation step are washed with cold water or methanol and dried.

The determination of the molar ratio of impurity to TA may be effected by any suitable method, many of which are known.

The process improvements of the present invention are further illustrated by the following examples.

EXAMPLE 1

A production unit being operated on the prior process was converted to the present process. A Swenson continuous, evaporative crystallizer was in service with about 1500 gallons of slurry contained therein. TA concentrate, 40% by weight TA, having IR of 0.15, was being introduced and water was being evaporated under 100 mm. Hg pressure at a temperature of 145 to 160° F. Slurry was being withdrawn and passed to a centrifuge. The crystals were being washed with cold methanol, dried and sent to storage. They had the following analysis and screen size.

Impurity ratio—0.010
Light transmission, 20% aqueous solution:
 At 305 m$\mu$, 5-cm. cell—60%
 At 500 m$\mu$—95%

Size distribution:
| U.S. mesh— | Percent |
| --- | --- |
| +30 | 35.9 |
| −30+40 | 20.0 |
| −40+60 | 17.1 |
| −60+80 | 7.0 |
| −80+100 | 4.0 |
| −100+140 | 4.4 |
| −140+200 | 5.1 |
| −200 | 6.5 |

The mother liquor from the separation was being collected in a storage tank and then was being processed for recovery of TA contained therein.

In accordance with the present invention, the step of returning mother liquor to the crystallizer was begun at a rate of about 23 gal./hour. The liquid phase in the crystallizer was monitored by taking samples every four hours, filtering, and determining the IR of the liquid phase. The flow of mother liquor was adjusted to maintain the IR within from about 1.0–1.4. Excess mother liquor was processed for TA recovery as needed to maintain a reasonably constant volume in the storage tank.

The crystals coming from the centrifuge, instead of being dried, were again dissolved in sufficient water to provide a 50% by weight concentrate having an IR of 0.020:1. Although the purity of the crystals at this stage is somewhat lower than the purity obtained by the prior process, the efficiency is greatly improved as a result of recycle of mother liquor.

The concentrate was filtered using standard Super-Cel filter aid and then introduced into a second Swenson evaporative crystallizer. After establishment of evaporative conditions, the crystallizer was operated at 150° F. and 100 mm. of pressure to effect formation of slurry. The IR of the liquid phase of the slurry was about 0.2. The slurry was pumped to a Sharples continuous combination conical pusher centrifuge, Model CD-200. The centrifuge was operated at 1980 r.p.m. generating a centrifugal force of about 1000 G and discharging product at a rate of 50 pushes per minute. The slurry was passed through at a rate of 1500 lb. per hour.

The mother liquor was passed to a storage tank and from there it was recycled to the second crystallizer at a rate sufficient to maintain an IR of about 0.2 in the liquid phase of the slurry. After continuous operative conditions were established, excess mother liquor was recycled to the first crystallizer.

The product was washed with 0.16 lb. of water per pound of product using a single nozzle and was then vacuum dried; it had the following properties.

Impurity ratio—.002

Light transmission, 20% aqueous solution:
 At 305 m$\mu$, 5-cm. cell—80.3%
 At 500 m$\mu$—97.5%.

Screen analysis:
| U.S. mesh— | Percent |
| --- | --- |
| +20 | 7.3 |
| −20+30 | 24.9 |
| −30+40 | 35.4 |
| −40+50 | 22.0 |
| −50+70 | 7.0 |
| −70+100 | 2.0 |
| −100 | 1.4 |

The above product was determined to be of high quality, free from water insoluble matter and suitable for refinement to pharmaceutical grade product. When used in the preparation of a vinyl oxazoline synthetic drying oil, the resulting color was Gardner (1933) 4, compared with 6 for a sample of oil prepared from product from the prior process.

The product was packaged in bags of 50 lb. each and stored on pallets in stacks of four bags for each layer and five layers high. When TA from the prior process was stored similarly, it showed 15–24% caking after one month. TA free from fines showed 0–1.1% caking. Caking was measured by passing a sample through a 10-mesh screen. The proportion, by weight, retained was reported as percent caking.

EXAMPLE 2

Second stage separation with pusher-type centrifuge

For this example, a slurry was prepared using screened commercial grade TA crystals and specially treated mother liquor from the prior process as the liquid phase. The purpose of using the specially prepared slurry was to be able to control the quality and size of the TA crystals and determine the extent of breakup and to control the composition of the liquid phase. The slurry was adjudged to be the equivalent of the slurry exiting from the second crystallizer unit. It was prepared as follows.

Mother liquor obtained from the prior process had a molar impurity ratio (IR) of 0.3:1 so commercial grade TA crystals in an amount sufficient to reduce the IR to 0.2:1 were dissolved therein. The water content was adjusted to about 38%. Two batches of the liquid phase were prepared in this manner. They had the following composition and properties:

|  | Batch No. | |
| --- | --- | --- |
|  | 1 | 2 |
| Impurity ratio | 0.20 | 0.18 |
| Crystallization point, °F | 142 | 145 |
| Total amines as TA, percent wt | 65.4 | 63.2 |
| TA (calc.), percent wt | 54.5 | 53.6 |
| Impurities (calc.), percent wt | 9.1 | 8.0 |
| Water (calc.), percent wt | 36.4 | 38.4 |

The above liquid phase was then heated to about 150° F., and sufficient crystalline TA of principally +60 mesh size was added to the slurry of about 35% by weight suspended solids. No substantial amount of TA dissolved. A sample of the TA crystals, when dissolved in water to form a 20% weight solution, had a 64.3% light transmission at 305 m$\mu$, 95.4% at 500 m$\mu$ and the color was 15 APHA.

The slurry was passed throught he Sharples conical pusher centrifuge at a rate of 1500 lb./hr. The centrifuge was operated at 1980 r.p.m. generating a centrifugal force of about 1000 G and discharging product at a rate of 50 pushes per minute. The product was washed with 0.16 lb. water per pound of product using a single nozzle and was then vacuum dried; it had the following properties.

Percent
Purity _____ 99.8
Light transmittance, 20% aqueous solution:
    At 350 m$\mu$, 5-cm. cell _____ 79.2
    At 500 m$\mu$ _____ 96.2
Color, APHA 10.
Size Distribution:

| Screen mesh | Original crystals, percent | Product, percent | Change |
| --- | --- | --- | --- |
| +20 | 13.4 | 14.4 | +1.0 |
| +30 | 32.9 | 30.6 | −2.3 |
| +40 | 34.5 | 35.3 | +0.8 |
| +50 | 15.4 | 15.1 | +0.1 |
| +70 | 3.0 | 3.5 | +0.3 |
| +100 | 0.5 | 0.7 | +0.2 |
| −100 | 0.3 | 0.4 | +0.1 |

Only negligible crystal breakage occurred in the centrifuge and it was determined to be satisfactory for storage under conditions which previously had caused sever caking.

EXAMPLE 3

Second stage separation with scroll-type centrifuge

For this experiment, a slurry was specially prepared as described in Example 2 and was passed through an 18 x 28 Bird Screen-Bowl continuous scroll-type centrifuge. The centrifuge was operated at 1200 r.p.m. providing a centrifugal force of 360 G and varying ratios of wash water to product were used. The discharge rate was 2100 lb./hr. of wet product which was then vacuum dried. The refined crystals had the following properties.

|  | Run No. | | |
| --- | --- | --- | --- |
|  | 1 | 2 | 3 |
| Wash ratio | 0.16 | 0.08 | 0.054 |
| Impurity ratio | 0.003 | 0.002 | 0.003 |
| Water, before drying, percent wt | 2.7 | 2.6 | 2.5 |
| Purity, after drying, percent wt |  |  |  |
| Light transmission: |  |  |  |
|   At 305 m$\mu$, percent | 74.5 | 73.9 | 73.3 |
|   At 500 m$\mu$ | 96.8 | 96.8 | 96.2 |
| Color, APHA | 30 | 25 | 25 |
| Melting Point, °C | 163.2 | 169.2 | 167.7 |

SIZE DISTRIBUTION

|  | Original crystals, percent | Product, percent | Change |
| --- | --- | --- | --- |
| Screen mesh: |  |  |  |
| +20 | 5.0 | 4.2 | −0.8 |
| +30 | 14.3 | 19.3 | +5.0 |
| +40 | 48.7 | 31.5 | −17.2 |
| +50 | 23.5 | 26.0 | +2.5 |
| +70 | 6.0 | 9.0 | +3.0 |
| +100 | 2.0 | 3.5 | +1.5 |
| −100 | 0.5 | 6.6 | +6.0 |

The product was determined to be of high quality. Only negligible crystal breakage occurred in the centrifuge so that the product can be stored satisfactorily without caking.

EXAMPLE 4

The experiment of Example 2 was repeated except that an Escher-Wyss two step-pusher centrifuge was substituted for the Sharples centrifuge.

The refined crystals so obtained had the following properties.

|  | Run No. | | |
| --- | --- | --- | --- |
|  | 1 | 2 | 3 |
| Wash ratio | 0.045 | 0.09 | 0.18 |
| Impurity ratio | 0.002 | 0.001 | 0.000 |
| Water, before drying, percent wt | 2.5 | 2.7 | 2.6 |
| Purity, after drying, percent wt |  |  |  |
| Light transmission: |  |  |  |
|   At 305 m$\mu$, percent | 61.2 | 68.2 | 72.9 |
|   At 500 m$\mu$ | 94.9 | 96.0 | 95.6 |
| Color, APHA | 15 | 15 | 15 |
| Melting Point, °C | 166.2 | 167.3 | 168.4 |

SIZE DISTRIBUTION

|  | Original crystals, percent | Product, percent | Change |
| --- | --- | --- | --- |
| Screen mesh: |  |  |  |
| +20 | 6.4 | 6.3 | −0.1 |
| +30 | 25.8 | 30.2 | +4.4 |
| +40 | 38.6 | 36.1 | −2.5 |
| +50 | 21.7 | 17.0 | −4.7 |
| +70 | 3.7 | 5.4 | +1.7 |
| +100 | 2.8 | 2.8 |  |
| −100 | 1.0 | 2.2 | +1.1 |

The product was determined to be of high quality. Only negligible crystal breakage occurred in the centrifuge so that the product can be stored satisfactorily without caking.

EXAMPLE 5

The experiment of Example 2 was repeated except that an 8 x 10 Baker-Perkins Single Stage Pusher centrifuge, Model S-8, was substituted for the Escher-Wyss centrifuge. The centrifuge was operated at a rate of 30 pushes per minute giving an output of 1260 lb./hr.

The refined crystals so obtained had the following properties.

|  | Run Number | | | | | |
| --- | --- | --- | --- | --- | --- | --- |
|  | 1 | 2 | 3 | 4 | 5 | 6 |
| Wash ratio | 0.052 | 0.062 | 0.086 | 0.107 | 0.15 | 0.216 |
| Impurity ratio | 0.000 | 0.000 | 0.007 | 0.016 | 0.007 | 0.000 |
| Water, percent wt | 2.1 | 2.2 | 2.2 | 2.1 | 2.6 | 2.7 |
| Purity, percent wt |  |  |  |  |  |  |
| Light transmission: |  |  |  |  |  |  |
|   At 305 m$\mu$, percent | 79.7 | 75.9 | 75.2 | 78.9 | 81.2 | 81.2 |
|   At 500 m$\mu$ | 94.2 | 94.2 | 94.1 | 95.2 | 95.3 | 95.6 |
| Color, APHA | 55 | 45 | 45 | 60 | 40 | 50 |
| Melting point, °C | 169.0 | 169.1 | 167.2 | 169.2 | 169.8 | 169.4 |

Size Distribution

|  | Original crystals, percent | Product, percent | Change |
| --- | --- | --- | --- |
| Screen mesh: |  |  |  |
| +20 | 3.0 | 2.0 | −1.0 |
| +30 | 20.5 | 14.0 | −6.5 |
| +40 | 40.5 | 40.0 | −0.5 |
| +50 | 24.0 | 30.0 | +6.0 |
| +70 | 7.0 | 7.5 | +0.5 |
| +100 | 3.5 | 2.5 | −1.0 |
| −100 | 1.5 | 4.0 | +2.5 |

The product was determined to be of high quality. Only negligible crystal breakage occurred in the centrifuge so that the product can be stored satisfactorily without caking.

We claim:
1. In a continuous two-stage crystallization process for the production of TA substantially free from small particles, free from water insoluble material and color-producing impurities, and having improved caking resistance, comprising the steps of:
   (A) introducing an aqueous TA solution having a molar IR of 0.15–0.3:1 into a first continuous evaporative crystallizer,
   (B) evaporating water from said solution, whereby a substantial amount of TA crystals form resulting in a slurry of solid TA crystals and mother liquor,
   (C) withdrawing said slurry at a rate sufficient to maintain a constant volume in said crystallizer,
   (D) separating said crystals from said mother liquor,
   (E) dividing said mother liquor in a first portion and a second portion and recovering TA from said second portion,
the improvement comprising the steps of:
   (a) recycling said first portion of said mother liquor to said first continuous evaporative crystallizer,
   (b) dissolving said TA crystals in water to form a second TA solution and filtering said solution,
   (c) evaporating said TA solution in a second continuous evaporative crystallizer, thereby forming a second slurry of solid TA crystals and mother liquor,
   (d) separating said TA crystals from said mother liquor in a continuous pusher-type centrifuge or a continuous scroll-type centrifuge, thereby producing TA crystals substantially free from fines and resistant to caking,
   (e) dividing said mother liquor in a first portion and a second portion, recycling said first portion to said second crystallizer in an amount sufficient to provide an IR of about 0.05 to about 0.4:1 in the liquid phase of the slurry contained therein and recycling said second portion to said first crystallizer.

References Cited
UNITED STATES PATENTS
3,338,970   8/1967   Schmitz et al. _____ 260—584

CHARLES B. PARKER, Primary Examiner

R. L. RAYMOND, Assistant Examiner

PO-1050
(5/69)

UNITED STATES PATENT OFFICE
CERTIFICATE OF CORRECTION

Patent No. 3,527,808          Dated September 8, 1970

Inventor(s) Frederick W. Schmitz and Robert E. Laine

It is certified that error appears in the above-identified patent and that said Letters Patent are hereby corrected as shown below:

Column 5, line 52 "sever" should be --severe--.
Column 6, line 9, in the table, third column, last line, "6.6" should be --6.5--.

FEB. 9, 1971

(SEAL)
Attest:

Edward M. Fletcher, Jr.
Attesting Officer

WILLIAM E. SCHUYLER, JR.
Commissioner of Patents